(12) United States Patent
Park et al.

(10) Patent No.: US 10,308,198 B2
(45) Date of Patent: Jun. 4, 2019

(54) ELECTRONIC DEVICE AND VEHICLE CONTROL METHOD USING THE SAME

(71) Applicant: Samsung Electronics Co., Ltd., Gyeonggi-do (KR)

(72) Inventors: Un-kyu Park, Seoul (KR); Woo-jin Park, Gyeonggi-do (KR); Sun-hee Youm, Gyeonggi-do (KR); Bo-sun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 31 days.

(21) Appl. No.: 15/591,467

(22) Filed: May 10, 2017

(65) Prior Publication Data
US 2017/0327084 A1    Nov. 16, 2017

Related U.S. Application Data

(60) Provisional application No. 62/334,093, filed on May 10, 2016.

(30) Foreign Application Priority Data

Jan. 16, 2017 (KR) .......................... 10-2017-0007175

(51) Int. Cl.
*G05D 1/00* (2006.01)
*B60R 16/037* (2006.01)

(52) U.S. Cl.
CPC .................. *B60R 16/037* (2013.01)

(58) Field of Classification Search
CPC ... B60R 25/24; B60R 2325/205; B60R 25/00; F02N 11/0807; G07C 5/008; G07C 9/00309; G07C 2009/00793
USPC .................... 701/2, 23, 49; 705/307
See application file for complete search history.

(56) References Cited

U.S. PATENT DOCUMENTS

| 6,775,603 B2* | 8/2004 | Yester ................... B60R 16/037 235/375 |
| 2014/0123299 A1* | 5/2014 | Jung ................. G06F 17/30312 726/26 |
| 2015/0148989 A1* | 5/2015 | Cooper ................. B60R 16/037 701/2 |

(Continued)

FOREIGN PATENT DOCUMENTS

| KR | 1020140018673 | 2/2014 |
| KR | 1020140022490 | 2/2014 |

*Primary Examiner* — Shardul D Patel
(74) *Attorney, Agent, or Firm* — The Farrell Law Firm, P.C.

(57) ABSTRACT

An electronic device is provided which includes a first communicator configured to communicate with a server, wherein the server matches and stores vehicle setting information and physical information of a user, a second communicator configured to communicate with a vehicle, and a processor configured to control the first communicator to transmit user identification information to the server and receive the vehicle setting information and the physical information corresponding to the user identification information from the server, generate a vehicle setting corresponding to the vehicle based on the vehicle setting information and the physical information received from the server, and vehicle information received from the vehicle, and transmit the generated vehicle setting to the vehicle through the second communicator.

18 Claims, 16 Drawing Sheets

(56) References Cited

U.S. PATENT DOCUMENTS

2015/0356797 A1* 12/2015 McBride ............ G07C 9/00119
340/5.61
2015/0370253 A1* 12/2015 Gurin ................. B60W 50/085
701/23
2016/0292929 A1* 10/2016 Konks ................. G06Q 20/145

* cited by examiner

ELECTRONIC DEVICE AND VEHICLE CONTROL METHOD USING THE SAME

PRIORITY

This application claims priority under 35 U.S.C. § 119(e) to U.S. Provisional Patent Application No. 62/334,093, which was filed on May 10, 2016 in the United States Patent & Trademark Office, and under 35 U.S.C. § 119(a) to Korean Patent Application No. 10-2017-0007175, which was filed on Jan. 16, 2017 in the Korean Intellectual Property Office, the content of each of which is incorporated herein by reference.

BACKGROUND

1. Field of the Disclosure

The present disclosure generally relates to an electronic device and a vehicle control method, and more particularly, to an electronic device configured to control components of a vehicle and a vehicle control method using the same.

2. Description of the Related Art

Various methods of remotely controlling a vehicle, such as using a remote controller or an infrared device, have been developed. However, these methods are capable of only simple control of a vehicle, such as door opening or starting the vehicle, which are less than satisfactory when considering a driver's various needs related to vehicle control.

Accordingly, the telematics technology field has been active in recent years. Telematics is a complex field comprising communications, information, vehicular technologies, vehicle diagnosis and control, multimedia service, navigation service, and so on through wired and wireless communication networks such as mobile communication networks and broadcasting networks.

However, use of telematics technology developed so far is limited in that each and every component present in a vehicle, e.g., position of a driver's seat, angle of a rearview mirror, and so on, has to be set by a telematics terminal or a mobile device.

Accordingly, it is necessary to develop a method for controlling a vehicle more conveniently.

SUMMARY

Accordingly, an aspect of the present disclosure provides an electronic device which generates vehicle setting information to control components of a vehicle and a vehicle control method using the same.

In accordance with an aspect of the present disclosure, an electronic device is provided which includes a first communicator configured to communicate with a server, in which the server matches and stores vehicle setting information and physical information of a user, a second communicator configured to communicate with a vehicle, and a processor configured to control the first communicator to transmit user identification information to the server and receive the vehicle setting information and the physical information corresponding to the user identification information from the server, generate a vehicle setting corresponding to the vehicle based on the vehicle setting information and the physical information received from the server, and vehicle information received from the vehicle, and transmit the generated vehicle setting to the vehicle through the second communicator.

In accordance with another aspect of the present disclosure, a vehicle control method is provided which includes transmitting user identification information to a server, receiving vehicle setting information and physical information corresponding to the user identification information from the server, and receiving vehicle information from a vehicle, generating a vehicle setting corresponding to the vehicle based on the received vehicle setting information, physical information, and vehicle information, and transmitting the generated vehicle setting to the vehicle.

BRIEF DESCRIPTION OF THE DRAWINGS

The above and/or other aspects, features and advantages of the present disclosure will be more apparent from the following detailed description, taken in conjunction with the accompanying drawings, in which.

DETAILED DESCRIPTION

Figure 1:
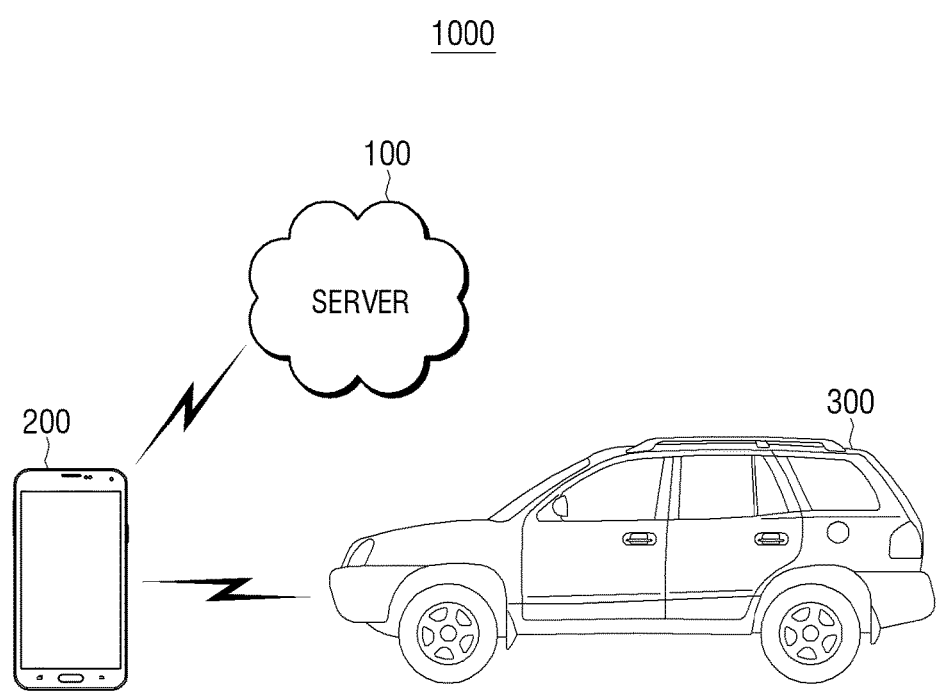
FIG. 1 is a diagram of a vehicle control system, according to an embodiment of the present disclosure.

Certain exemplary embodiments of the present disclosure will now be described in detail with reference to the accompanying drawings.

In the following detailed description, similar drawing reference numerals may be used to designate similar elements. The content of the present disclosure, such as detailed construction and components, are provided to assist in a comprehensive understanding of the present disclosure. Also, well-known functions or constructions are not described in detail since they would obscure the disclosure with unnecessary detail.

The terms used in the present disclosure are only used to describe the embodiments, but do not limit the scope of the disclosure. The singular expression also includes the plural meaning as long as it does not conflict with the context. In the present disclosure, the terms "include" and "consist of" designate the presence of features, numbers, steps, operations, components, elements, or a combination thereof that are written in the specification, but do not exclude the presence or possibility of the addition of one or more other features, numbers, steps, operations, components, elements, or a combination thereof.

In an embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor.

FIG. 1 is a diagram of a vehicle control system, according to an embodiment of the present disclosure.

As illustrated in FIG. 1, the vehicle control system 1000 includes a server 100, an electronic device 200, and a vehicle 300.

According to an embodiment of the present disclosure, the vehicle 300 may be a vehicle that may be boarded by a person and/or loaded with a cargo. For example, the vehicle 300 may be a car, an airplane, a motorcycle, an (electric) bicycle, an electric wheel, a ship, a train, and the like. Further, when the vehicle 300 is a car, the vehicle may be a mini size, a medium size, a large size, a two-wheeled vehicle, and may further include a passenger car, a van, a truck, a bus, and a cargo vehicle.

Herein, embodiments of the present disclosure will be described with an assumption that the vehicle 300 is a car.

The server 100 may store a user's physical information and vehicle setting information, the user may be a driver or a passenger.

According to an embodiment of the present disclosure, the user's physical information may include height, weight, upper body height, lower body height, arm length, foot length, and so on.

Further, the vehicle setting information may be information for the setting state of a vehicle that has a record of previous use by a user. According to an embodiment of the present disclosure, the vehicle setting information may include field-of-view information of a driver, information of applications installed on a vehicle, information of a means of payment associated with a vehicle, and so on.

Further, the server 100 may transmit the user's physical information and the vehicle setting information to the electronic device 200.

The vehicle 300 may transmit the vehicle information to the electronic device 200.

According to an embodiment of the present disclosure, the vehicle information may include various pieces of information regarding the vehicle 300. For example, the vehicle information may include information on a type of vehicle 300, e.g., information on whether the vehicle 300 is a sedan or SUV-type vehicle, and may further include information regarding inner or outer components of the vehicle 300, e.g., information regarding wheel size, angle of a driver seat that is variable, position of a rearview mirror, and so on.

Further, based on the vehicle setting information and the user's physical information received from the server 100, and the vehicle information received from the vehicle 300, the electronic device 200 may generate vehicle setting information corresponding to the vehicle 300 and transmit the generated information to the vehicle 300.

Specifically, the vehicle setting information received from the server 100 by the electronic device 200 may include information that may be used in the vehicle 300, such as application information and means of payment information, and information that cannot be used uniformly in the vehicle 300, such as field-of-view information of a driver in which setting value information of vehicle components is varied according to body parts of a user, type of a vehicle, and so on.

According to an embodiment of the present disclosure, the electronic device 200 may directly transmit the information that may be continuously used in the vehicle 300 to the vehicle 300, and, with respect to the information that cannot be used uniformly in the vehicle 300, the electronic device 200 may generate the vehicle setting information corresponding to the vehicle 300 based on the user's physical information and the vehicle's information and transmit the generated information to the vehicle 300.

Accordingly, the vehicle control system 1000, according to an embodiment of the present disclosure may provide personalized vehicle component setting more conveniently, by setting the components of the vehicle 300 at once, using first setting information of adaptive value information of the vehicle components according to type of vehicle, and second setting information having a constant setting value irrespective of the type of vehicle.

Figure 2:
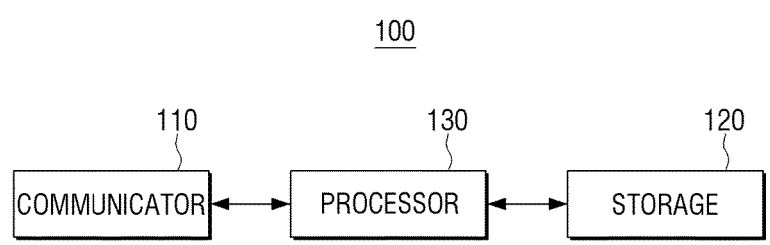
FIG. 2 is a block diagram of a server, according to an embodiment of the present disclosure.

FIG. 2 is a block diagram of a server, according to an embodiment of the present disclosure.

As illustrated in FIG. 2, the server 100 includes a communicator 110, a storage 120 and a processor 130. According to an embodiment of the present disclosure, the server 100 may be implemented as a central server (or integrated server) for managing interactions among various operating systems and applications in a network system, or a cloud server using cloud computing technology. The term 'cloud computing' refers to an Internet-based computing and storage technology, which is a web-based software service that stores programs in a data server on the Internet, and provides programs to a computer, a mobile phone, and so on, for use thereof.

The communicator 110 may transmit and receive various data in communication with the electronic device 200. Specifically, the communicator 110 in communication with the electronic device 200 may receive user identification information, and transmit the vehicle setting information and the physical information corresponding to the user identification information.

In the above example, the communicator 110 may use a communications protocol associated with wireless fidelity (WiFi), 3rd generation partnership project (3GPP), long term evolution (LTE), and so on.

The storage 120 may store various programs and data required for operation of the server 100.

The storage 120 may store the user's physical information and the vehicle setting information. As described above, the vehicle setting information may include the first setting information of adaptive value information of vehicle components according to the type of vehicle, and the second setting information having a constant setting value irrespective of the type of vehicle.

For example, the first setting information may be field-of-view information of a driver from a previously-used vehicle, and the second setting information may be information of applications installed in the vehicle, means of payment information associated with the vehicle, and so on.

Further, the storage 120 may store data for generating the first setting information. Specifically, the storage 120 may store data for generating the first setting information based on the user's physical information, setting value information of the vehicle components, and vehicle information.

For example, the storage 120 may store a field of view of a driver as corresponding to K, when an upper body length of a user is A cm and a lower body length is B cm, or when an angle of a driver's seat is X degree and a distance between a driver's seat and a pedal is R cm, or when a wheel diameter of the vehicle is L cm. That is, the storage 120 may store the first setting information corresponding to the information including the user's body, setting value information of the vehicle components, and the vehicle information.

The storage 120 may match and store the user's physical information and the vehicle setting information for each user. In the above example, the storage 120 may store the user's physical information and the vehicle setting information, matched with the user identification information.

According to an embodiment of the present disclosure, the user identification information may be the user's fingerprint information, iris information, vehicle application ID information, and so on. Accordingly, the storage 120 may store at least one of the user's fingerprint information, the iris information and the vehicle application ID information, matched with the user's physical information and the vehicle setting information.

In the above example, the storage 120 may be implemented as a variety of storage media such as hard disk, non-volatile memory, volatile memory, and so on.

The processor 130 may control overall operation of the server 100. For example, the processor 130 may drive an operating system or application programs to control hardware or software components connected to the processor 130, and perform various data processing and arithmetic operations. Further, the processor 130 may load the volatile memory with commands or data received from at least one of the other components and process the same, and may store various data in the non-volatile memory.

In the above example, the processor 130 may be implemented as a dedicated processor (e.g., embedded processor) for performing a corresponding operation, or a general-purpose processor (e.g., CPU or application processor) that may perform a corresponding operation by running one or more software programs stored in a memory device.

The processor 130 may generate the vehicle setting information from the vehicle previously used by a user. Specifically, the processor 130 may generate the first setting information of adaptive value information of the vehicle components according to the type of vehicle. For example, the first setting information may be the field-of-view information of a driver from a vehicle previously used by the driver.

Specifically, the processor 130 may generate the field-of-view information of a user sitting in a driver's seat based on the user's physical information, such as upper body length and lower body length of a user, or setting value information of the vehicle components from a previously-used vehicle, such as distance set by a user between a pedal and a driver's seat, a height of a driver's seat, an angle of a driver's seat, and so on, or the vehicle information, such as, information on whether the vehicle is a sedan type or an SUV type.

In the above example, the processor 130 may use the information received from the electronic device 200, i.e., the user's physical information, setting value information of the vehicle components and vehicle information, and the information of a plurality of field of views stored in the storage 120.

For example, in response to determining that an upper body length of a user is A cm and a lower body length is B cm (physical information), and an angle of a driver's seat is X degrees and a distance between a driver's seat and a pedal is R cm (setting value information of the vehicle components), and a wheel diameter of the vehicle is L cm (vehicle information), the processor 130 may search a corresponding field of view from the storage 120 and determine a field of view of the driver.

Accordingly, the processor 130 may search the field-of-view information corresponding to the user's physical information, the setting value information of the vehicle components and the vehicle information, among the information of a plurality of field of views stored in the storage 120, and generate the field-of-view information of the driver.

Further, the processor 130 may generate the second setting information having a constant setting value irrespective of the type of vehicle.

As described above, the second setting information may include information of applications installed in the vehicle previously used by a user, means of payment information associated with the vehicle, network connection information of the vehicle, information associated with navigation of the vehicle, and driving mode information of the vehicle.

Further, when the user identification information is received from the electronic device 200 through the communicator 110, the processor 130 may control the communicator 110 to transmit the vehicle setting information and the physical information corresponding to the user identification information to the electronic device 200.

Specifically, when the user identification information is received from the electronic device 200 through the communicator 110, the processor 130 may determine the vehicle setting information and the physical information corresponding to the user identification information among a plurality of vehicle setting information and the physical information stored in the storage 120. For example, when a user logs in through a vehicle application installed on the electronic device 200, the processor 130 may receive information for login ID from the electronic device 200, determine the vehicle setting information and the physical information corresponding to the login ID information, and transmit the result to the electronic device 200.

The processor 130 may receive information that may identify a user, such as a user's fingerprint information or iris information, from the electronic device 200, determine the vehicle setting information and the physical information corresponding to the received user identification information, and transmit a result to the electronic device 200.

Further, the processor 130 may control the communicator 110 to transmit the generated vehicle setting information to the electronic device 200.

Figure 3:
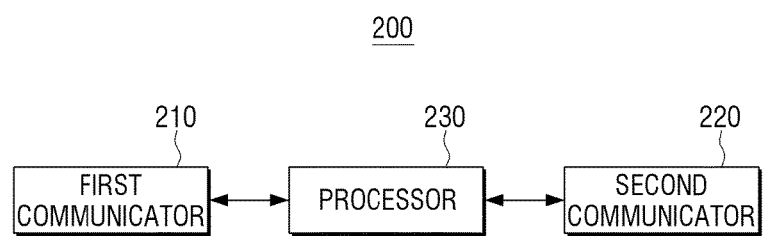
FIG. 3 is a block diagram of an electronic device, according to an embodiment of the present disclosure.

FIG. 3 is a block diagram of an electronic device according to an embodiment of the present disclosure.

As illustrated in FIG. 3, the electronic device 200 includes a first communicator 210, a second communicator 220, and a processor 230.

The first communicator 210 and the second communicator 220 may communicate with various types of external devices according to various types of communication methods.

Specifically, the first communicator 210 may communicate with the server 100 to transmit and receive various data. The first communicator 210 in communication with the server 100, may transmit the user identification information to the server 100, and then receive the vehicle setting information and the user's physical information corresponding to the user identification information from the server 100. The first communicator 210 may include various communication protocols including WiFi, vehicle to vehicle, and cellular.

The second communicator 220 may communicate with the vehicle 300. Specifically, the second communicator 220, in communication with the vehicle 300, may transmit a vehicle information request signal to the vehicle 300, and then receive the vehicle information from the vehicle 300. The second communicator 220 may include various communication protocols including WiFi, Bluetooth™, device to device, and near field communication (NFC).

The processor 230 may control overall operation of the electronic device 200. For example, the processor 230 may drive the operating system or the application programs to control hardware or software components connected to the processor 230, and perform various data processing and arithmetic operations. Further, the processor 230 may load commands or data received from at least one of the other components to the non-volatile memory and process the same, and store various data in the non-volatile memory.

In the above example, the processor 230 may be implemented as a dedicated processor for performing a corresponding operation (e.g., embedded processor), or as a general-purpose processor (e.g., CPU or application processor) that may perform a corresponding operation by running at least one software programs stored in the memory device.

The processor 230 may control the second communicator 220 to transmit a vehicle information request signal to the vehicle 300 upon being connected to the vehicle 300 through the second communicator 220.

The processor 230 may control the second communicator 220 to connect the second communicator 220 to the vehicle 300 when a preset event occurs. For example, in response to the occurrence of a preset event, such as user's logging-in with the vehicle application, the processor 230 may control the second communicator 220 to connect the second communicator 220 to the vehicle 300. In the above example, a network address of the vehicle 300 may be previously stored in the electronic device 200.

Further, upon being connected to the server 100 through the first communicator 210, the processor 230 may control the first communicator 210 to transmit the user identification information to the server 100.

In response to the occurrence of a preset event, the processor 230 may control the first communicator 210 to connect the first communicator 210 to the server 100. For example, in response to the occurrence of a preset event such as user's logging-in with the vehicle application, the processor 230 may control the first communicator 210 to connect the first communicator 210 to the server 100. In the above example, the electronic device 200 may previously store a network address of the server 100.

According to an embodiment of the present disclosure, when a user logs in through the vehicle application, the user identification information may be the vehicle application user ID information. However, this is one embodiment and the present disclosure is not limited to such. The user identification information may include various identification information such as fingerprint or iris information that may identify a user.

The processor 230 may control the first communicator 210 to receive the vehicle setting information and the physical information corresponding to the user identification information from the server 100.

When the user identification information is received from the electronic device 200, the server 100 may search the vehicle setting information and the user's physical information matched with the user identification information among a plurality of vehicle setting information and the user's physical information stored in the server 100, and transmit a result to the electronic device 200. Accordingly, the processor 230 may control the first communicator 210 to receive the vehicle setting information and the user's physical information matched with the user identification information stored in the server 100.

Further, when the vehicle setting information and the user's physical information are received from the server 100 and the vehicle information is received from the vehicle 300, the processor 230 may generate the vehicle setting information corresponding to the vehicle 300 based on the received information.

According to an embodiment of the present disclosure, the vehicle setting information received from the server 100 may include the first setting information and the second setting information. In other words, the vehicle setting information may include the first setting information of adaptive value information of the vehicle components according to the type of vehicle, and the second setting information having a constant setting value irrespective of the type of vehicle.

For example, the first setting information may be field-of-view information of a driver of the vehicle previously used by the user. Specifically, the first setting information may be field of views in upper and lower, left and right directions of a driver sitting in a driver's seat who is looking through the front window.

Between different types of vehicles, even when arrangement of the vehicle components (e.g., angle of a driver's seat, distance between a pedal and a driver's seat) are identical, an overall height of the vehicle may be different due to differences in wheel size, and accordingly, the field of view of the driver may be different. For example, the field of view of the driver may be different according to whether the vehicle is a sedan or an SUV type even when the arrangement of the driver's seat are identical. Therefore, arrangement of the vehicle components, such as setting value with respect to an angle of a driver's seat, a distance between a pedal and a driver's seat, and so on, may be adaptively changed according to the type of vehicle such that a field of view of a driver may be kept uniform when the type of vehicle is different. Adaptive value information of the vehicle components according to the type of vehicle may be the first setting information.

Use of the information of the driver's field of view is one of the examples of the first setting information. Accordingly, when the information is to adaptively change setting value information of the vehicle components according to the type of vehicle, such information may be included in the first setting information. For example, the first setting information may be information of an angle between the driver's eyes and the rearview mirror. In this case, in order to maintain a constant angle between the driver's eyes and the rearview mirror between different types of vehicles, the vehicle components to be adaptively changed may include the angle of a driver's seat, a headrest of a driver's seat, and a rearview mirror.

The second setting information may be information of applications installed in the vehicle, information of a means of payment associated with the vehicle, information of the network connection of the vehicle, information associated with navigation of the vehicle, and information of the driving mode of the vehicle. The second setting information may include information for a device having a constant setting value irrespective of the type of vehicle, which is different from the first setting information that adaptively changes arrangement of the vehicle components according to the type of vehicle.

According to an embodiment of the present disclosure, the information of applications installed in the vehicle may be a music play application and a navigation application installed in the vehicle previously used by a user. Further, the information of a means of payment associated with the vehicle may be information regarding a credit card associated with a prepaid toll system for expressways (e.g., EZ-Pass). Further, the information of the network connection of the vehicle may be a network address (medium access control (MAC) address or Internet protocol (IP) address) of the WiFi or Bluetooth™ first communicator 210 or second communicator 220, and the driving mode of the vehicle may previously set by a user.

Further, the processor 230 may generate third setting information corresponding to the vehicle 300 based on the vehicle setting information received from the server 100 (e.g., the first setting information and the physical information), and the vehicle information received from the vehicle 300. As described above, the third setting information may be setting value information of the vehicle components, which is adaptively changed according to the vehicle information in order to uniformly maintain the first setting information of the vehicle previously set by a user in another type of vehicle 300.

Figure 4:
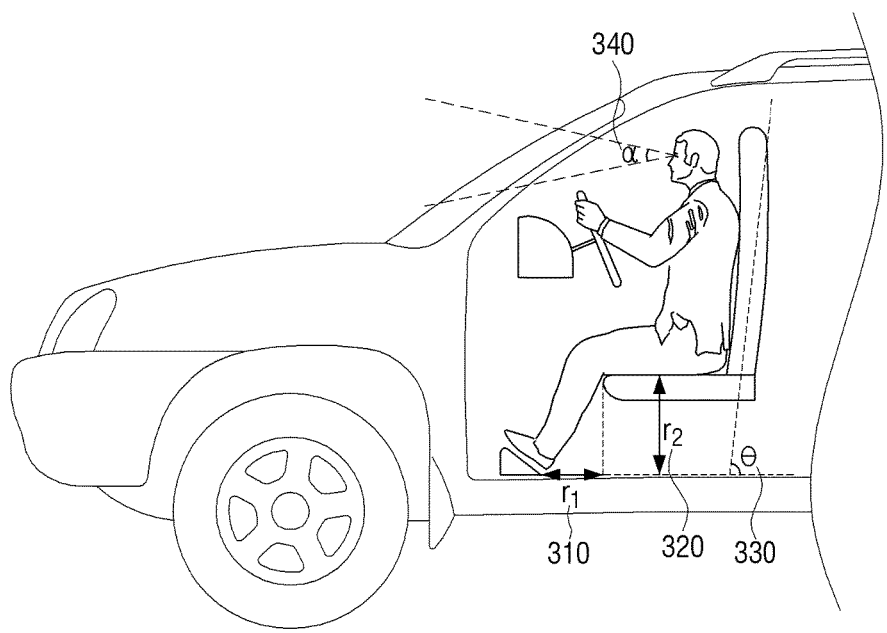
FIG. 4 illustrates a method of controlling a vehicle when first setting information is field-of-view information, according to an embodiment of the present disclosure.

According to an embodiment of the present disclosure described below, a method of generating the third setting information by the electronic device 200 with reference to FIG. 4 is described.

Referring to FIG. 4, the first setting information may include information of a field of view (a) 340 of a first vehicle of a driver.

The third setting information may be information that corresponds to a distance (r1) 310 between a pedal and a driver's seat, a height (r2) 320 of a driver's seat, an angle (θ) 330 of a driver's seat, to a driver of a second vehicle 300 having a field of view (α) 340 included in the first setting information.

In the above example, the processor 230 may generate the third setting information by using data for generating the first setting information stored in the server 100.

The processor 230 may use the data for generating the first setting information stored in the server 100 to search the setting value information of the vehicle components corresponding to the first setting information, the user's physical information and the vehicle information.

For example, in response to receiving the user's physical information from the server 100 informing that an upper body length of a user is A cm and a lower body length is B cm, the first setting information informing that a field of view of a driver is a, and the vehicle information received from the vehicle 300 informing that a wheel diameter of the vehicle is L cm, the processor 230 may search the third setting information based on the first setting information.

Accordingly, the processor 230 may determine the third setting information indicating an angle of a driver's seat to be θ 330, a distance between a driver's seat and a pedal to be R1 cm 310, and a height of a driver's seat to be R2 cm 320 for a user to have a field of view α 340 in the second vehicle.

The processor 230 may generate the third setting information based on the first setting information, the user's physical information and the vehicle information when a user is changed in the same vehicle 300.

For example, when a second user uses the vehicle 300 after a first user changes a setting value of the components of the vehicle 300, the processor 230 may change the setting value information of the vehicle components according to the method described above based on the physical information of the second user, the first setting information of the second user, and the vehicle 300 information.

According to an embodiment of the present disclosure, when a user buys a new vehicle or rents a vehicle, the user is able to perform a personalized vehicle setting conveniently, using the vehicle information of the user's previous vehicle.

According to an embodiment of the present disclosure, in a case in which one vehicle is shared and used by a plurality of users, when a second user uses the vehicle after a first user changes the setting of the vehicle, the second user may perform a personalized vehicle setting using the vehicle setting information previously set.

Without having to individually set a distance r1 310 between a pedal of the vehicle 300 and a driver's seat, a height r2 330 of a driver's seat, an angle θ 330 of a driver's seat, and so on in order to personalize the setting of the vehicle, a user may set only one setting information, e.g., the field-of-view information α 340, in which case, the distance r1 310 between a driver's seat and a pedal, a height r2 320 of a driver's seat, and an angle θ 330 of a driver's seat may be set corresponding to the field-of-view information α 340.

Embodiments of the present disclosure discussed below describe a process of controlling the vehicle through the electronic device 200 in detail with reference to FIGS. 5 to 7.

Figure 5:
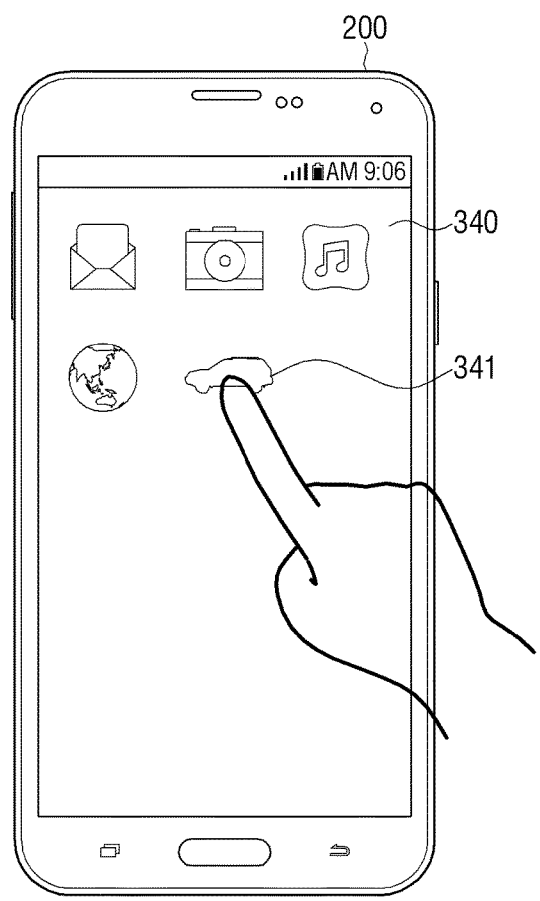
FIG. 5 is a screenshot of a process of changing a setting of a vehicle through a vehicle application, according to an embodiment of the present disclosure.
Figure 6:
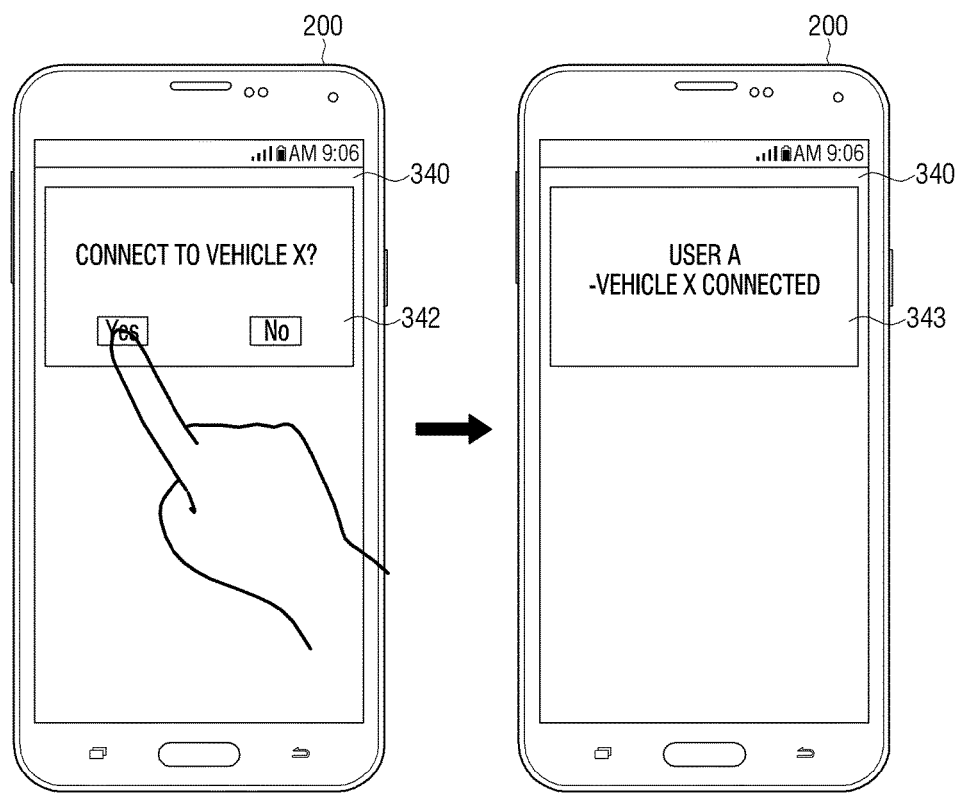
FIG. 6 is a screenshot of a process of changing a setting of a vehicle through a vehicle application, according to another embodiment of the present disclosure.
Figure 7:
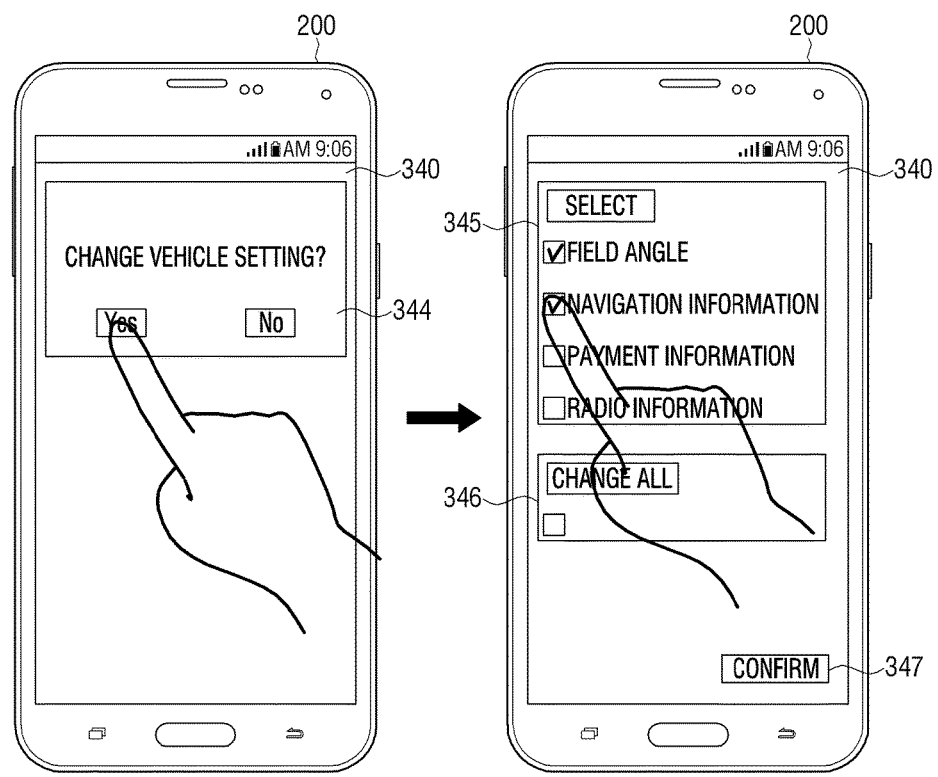
FIG. 7 is a screenshot of a process of changing a setting of a vehicle through a vehicle application, according to another embodiment of the present disclosure.

FIG. 5 is a screenshot of a process of changing a setting of a vehicle through a vehicle application, according to an embodiment of the present disclosure;

FIG. 6 is a screenshot of a process of changing a setting of a vehicle through a vehicle application, according to another embodiment of the present disclosure;

FIG. 7 is a screenshot of a process of changing a setting of a vehicle through a vehicle application, according to another embodiment of the present disclosure;

Referring to FIGS. 5-7, the electronic device 200 may further include a display 340. According to an embodiment of the present disclosure, the display 340 may display various screens. The display 340 may display a vehicle application 341, a user interface 342 to perform a network connection between the electronic device 200 and the vehicle 300, and user interfaces 345, 346 to change the vehicle setting.

The display 340 may be implemented as a liquid crystal display (LCD) or an organic light emitting diode (OLED) display.

As illustrated in FIG. 5, the electronic device 200 may display the vehicle application 341. According to an embodiment of the present disclosure, the vehicle application 341 may be an application for a network connection between the electronic device 200 and the vehicle 300.

When a user executes the vehicle application 341 and a log-in process, the electronic device 200 may display the user interface 342 asking whether to perform a network connection between the electronic device 200 and the vehicle 300.

When a user inputs a command to perform a network connection with the vehicle 300, the electronic device 200 may be connected with the vehicle 300. The electronic device 200 may have previously stored a network address of the vehicle 300. When a user stores a network address of the vehicle 300 through a setting of the vehicle application 341, the electronic device 200 may be connected with the vehicle 300 by using a network address of the vehicle 300 corresponding to a user ID as the user logs in through the vehicle application 341.

If a network address of the vehicle 300 is not stored in the electronic device 200, the electronic device 200 may display an additional user interface requesting inputting of a network address of the vehicle 300, and accordingly, the electronic device 200 and the vehicle 300 may be connected using the inputted network address.

When network connection between the electronic device 200 and the vehicle 300 is performed, the electronic device 200 may display the user interface 343 including the user identification information and the vehicle information.

The electronic device 200 may transmit a vehicle information request signal to the vehicle 300 when network connection with the vehicle 300 is performed. When the vehicle information is received from the vehicle 300, the electronic device 200 may display the user interface 343 including the user identification information and the vehicle information.

Further, the electronic device 200 may display the user interface 344 requesting whether to change the vehicle setting of the networked vehicle 300. According to an embodiment of the present disclosure, when a user inputs a user command for changing setting of the vehicle, the electronic device 200 may transmit the vehicle information received from the vehicle 300 with the user identification information, i.e., the login ID, to the server 100.

When the user identification information and the vehicle information are transmitted to the server 100, the server 100 may determine whether a user has access to the vehicle 300. The server 100 may determine whether an ID has access to a vehicle 300 based on the user ID and the vehicle information received from the electronic device 200. In the above example, the server 100 may match and store the user ID having access authority to a corresponding vehicle.

When a user is determined as having access to the vehicle 300, the server 100 may transmit the vehicle setting information and the physical information corresponding to the user identification information to the electronic device 200.

Further, the electronic device 200 may generate the vehicle setting information corresponding to the vehicle 300 based on the vehicle setting information and the physical information received from the server 100 and the vehicle information received from the vehicle 300.

When a user inputs a command for changing the vehicle setting, the electronic device 200 may display the user interfaces 345, 346 for changing the vehicle setting, and set the vehicle 300 correspondingly to the vehicle setting information selected by a user.

According to an embodiment of the present disclosure, the user interfaces 345, 346 for changing the vehicle setting may include a user interface 345 to allow a user to selectively change the vehicle setting, and a universal-change user interface 346 to change the vehicle settings all at once.

Instead of the selective-change user interface 345 and the universal-change user interface 346, the user interfaces 345, 346 may include various other user interfaces related to changing the vehicle setting such as screen to change the first setting information which adaptively changes setting value information of the vehicle components according to the type of vehicle, and change the second setting information having a constant setting value irrespective of the type of vehicle.

Further, when a user selects an item to change the vehicle setting and then selects the user interface 347 to confirm the change, the electronic device 200 may transmit the generated vehicle setting information to the vehicle 300.

When the vehicle setting information is transmitted to the vehicle 300, the vehicle 300 may set the arrangement of a driver's seat, height of a driver's seat, and so on in the vehicle 300 by using the received vehicle setting information.

The electronic device 200 provides various user interfaces through the display 340, and a user may change network connections and vehicle settings more conveniently.

Figure 8:
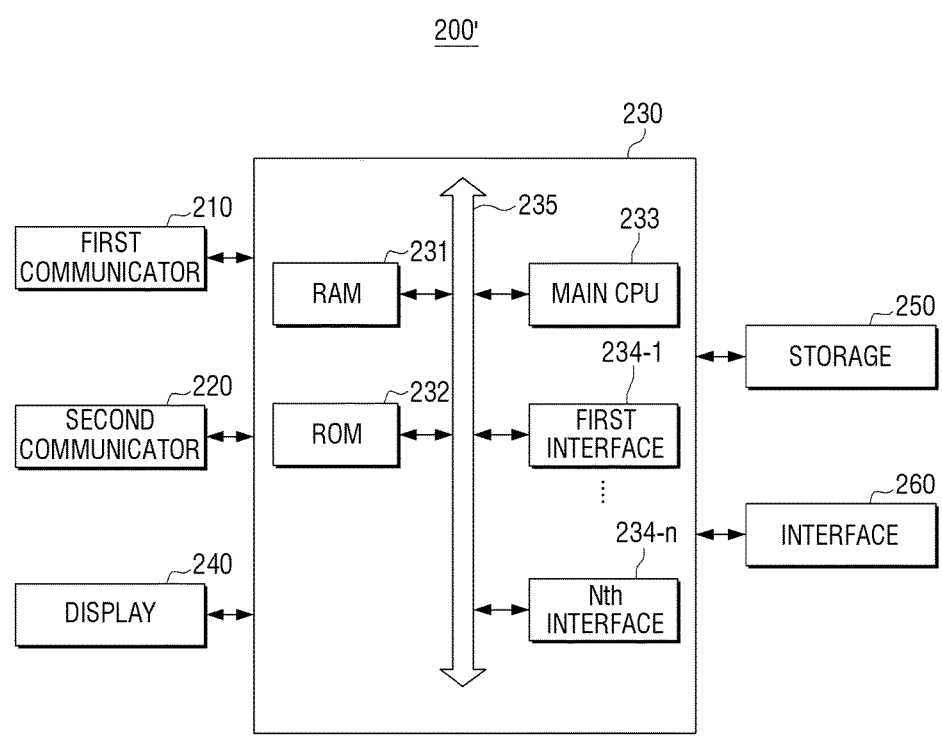
FIG. 8 is a block diagram of an electronic device, according to an embodiment of the present disclosure.

FIG. 8 is a block diagram of an electronic device, according to an embodiment of the present disclosure.

As illustrated in FIG. 8, the electronic device 200' includes a first communicator 210, a second communicator 220, a processor 230, a display 240, a storage 250, and an interface 260.

The processor 230 is configured to control overall operation of the electronic device 200'. The processor 230 includes RAM 231, ROM 232, a main CPU 233, first to (n) th interfaces 234-1 to 234-n, and a bus 235. According to an embodiment of the present disclosure, the RAM 231, the ROM 232, the main CPU 233, and the first to (n) th interfaces 234-1 to 234-n may be connected to each other through the bus 235.

The first to (n) th interfaces 234-1 to 234-n are connected to various elements described above. One of the interfaces may be a network interface which is connected through a network to at least one of the server and the vehicle.

The main CPU 233 may access the storage 250, and perform booting using the OS stored in the storage 250. Further, the main CPU 233 may perform various operations by using various programs, content, and data stored in the storage 250.

The RAM 231 may store an instruction set for system booting. When a turn-on command is input and the power is supplied, the main CPU 233 may copy the stored OS from the storage 250 into the RAM 231 according to the instructions stored in the ROM 232, and boot the system by running the OS. When booting completes, the main CPU 233 may copy the various programs stored in the storage 250 to the RAM 231, and perform various operation by running the copied programs on the RAM 231.

Operation of the above described processor 230 may be performed by the programs stored in the storage 250.

The storage 250 may store various data such as an operating system (OS) software module for driving the electronic device 200' and various multimedia content.

Specifically, the storage 250 may store a base module which processes signals delivered from hardware included in the electronic device 200', a storage module which manages a database (DB) or registry, a graphic process module which generates a layout screen, a security module, and so on. Further, the storage 250 may store the user's physical information and the vehicle setting information.

The interface 260 may receive various user commands. According to an embodiment of the present disclosure, the interface 260 may be implemented as various forms. When the electronic device 200' is implemented as a touch-screen based portable terminal, the interface 260 may be implemented as a touch screen having a touch pad. Specifically, the interface 260 may receive a command to transmit a request for the vehicle information to the vehicle 300 and a command to transmit the user identification information and the vehicle information to the server 100.

Figure 9:
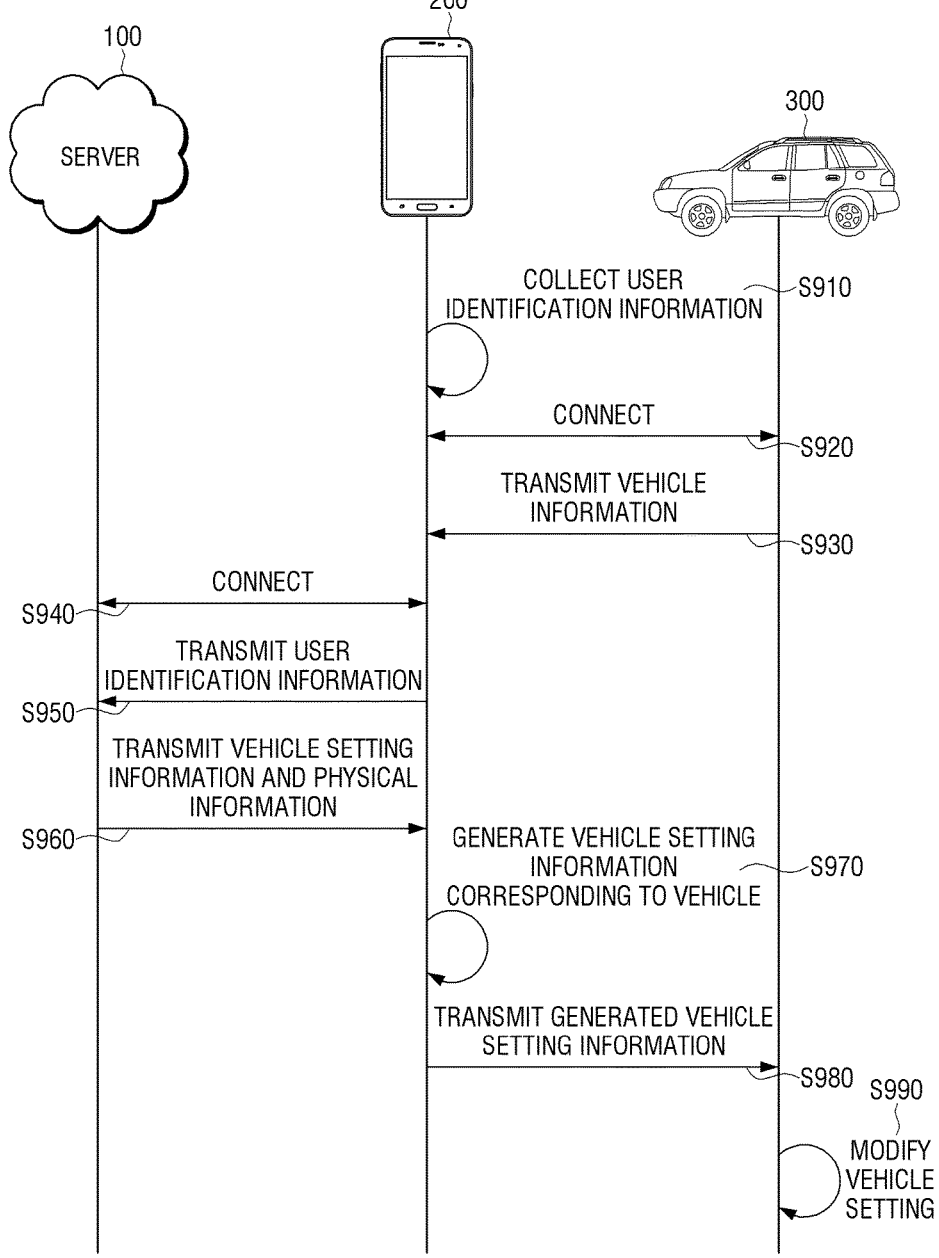
FIG. 9 is a flow diagram of a process of controlling a vehicle with a vehicle control system, according to an embodiment of the present disclosure.

FIG. 9 is a flow diagram of a process of controlling a vehicle with a vehicle control system, according to an embodiment of the present disclosure.

Referring to FIG. 9, the electronic device 200 collects the user identification information at S910. According to an embodiment of the present disclosure, the user identification information may be information of the user ID logging in through the vehicle application, the fingerprints of a user, or the iris information of the user.

Further, the electronic device 200 may be connected to the vehicle 300 through the collected user identification information at step S920. For example, the electronic device 200 may be networked with the vehicle 300 when a user logs in through the vehicle application.

Further, when the electronic device 200 transmits a vehicle information request signal to the vehicle 300, the vehicle 300 may transmit the vehicle information to the electronic device 200 at step S930. According to an embodiment of the present disclosure, the vehicle information may include various pieces of information regarding the vehicle 300. For example, the vehicle information may include information on the type of vehicle 300, and the size and position of the components within the vehicle.

Further, the electronic device 200 may be connected to the server 100 at step S940. For example, the electronic device 200 may be connected to the server 100 when a user logs in through the vehicle application.

Further, when the electronic device transmits the user identification information to the server at step S940, the server 100 may search the vehicle setting information and the physical information corresponding to the user identification information, and transmit the searched vehicle setting information and physical information to the electronic device 200 at step S960. According to an embodiment of the present disclosure, the vehicle setting information may include information regarding setting of the vehicle previously used by a user. Specifically, the vehicle setting information may include the first setting information of adaptively changing a setting value in the vehicle components according to the type of vehicle, and the second setting information having a constant setting value irrespective of the type of vehicle.

Further, the electronic device 200 may generate the vehicle setting information corresponding to the vehicle at step S970 based on the received vehicle setting information, physical information and vehicle information, and transmit a result to the vehicle 300 at step S980.

The vehicle 300 receiving the vehicle setting information may change the setting of the vehicle based on the vehicle setting information at step S990.

Figure 10:
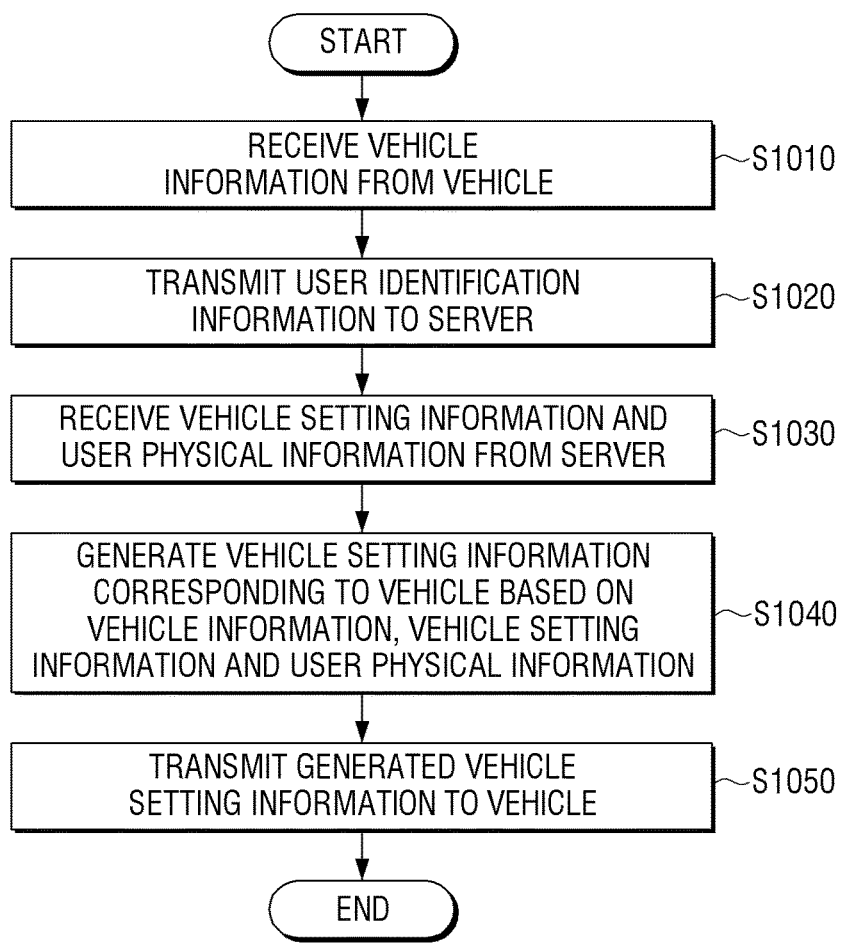
FIG. 10 is a flowchart of a process in an electronic device for controlling a vehicle, according to an embodiment of the present disclosure.

FIG. 10 is a flowchart of a process in an electronic device for controlling a vehicle, according to an embodiment of the present disclosure.

Referring to FIG. 10, the electronic device 200 transmits a vehicle information request signal to the vehicle 300 and receives vehicle information from the vehicle 300 at step S1010.

Further, the electronic device 200 transmits the generated user identification information to the server 100 through the electronic device 200 or the server 100 at step S1020. According to an embodiment of the present disclosure, the user identification information generated in the electronic device may be login information, fingerprint information, or iris information. The user identification information generated through the server may be the user ID logging in through the vehicle application.

Further, the electronic device 200 receives the vehicle setting information and the user's physical information from the server 100 at step S1030, and generates vehicle setting information corresponding to the vehicle 300 based on the vehicle information, the vehicle setting information and the user's physical information at step S1040.

The electronic device 200 transmits the generated vehicle setting information to the vehicle 300 at step S1050.

The electronic device 200 may generate the vehicle setting information corresponding to the vehicle 300. However, the vehicle setting information may be generated by the server 100 or the vehicle 300.

Embodiments discussed below describe a process of generating the vehicle setting information according to an embodiment of the present disclosure with reference to FIGS. 11 to 14.

Figure 11:
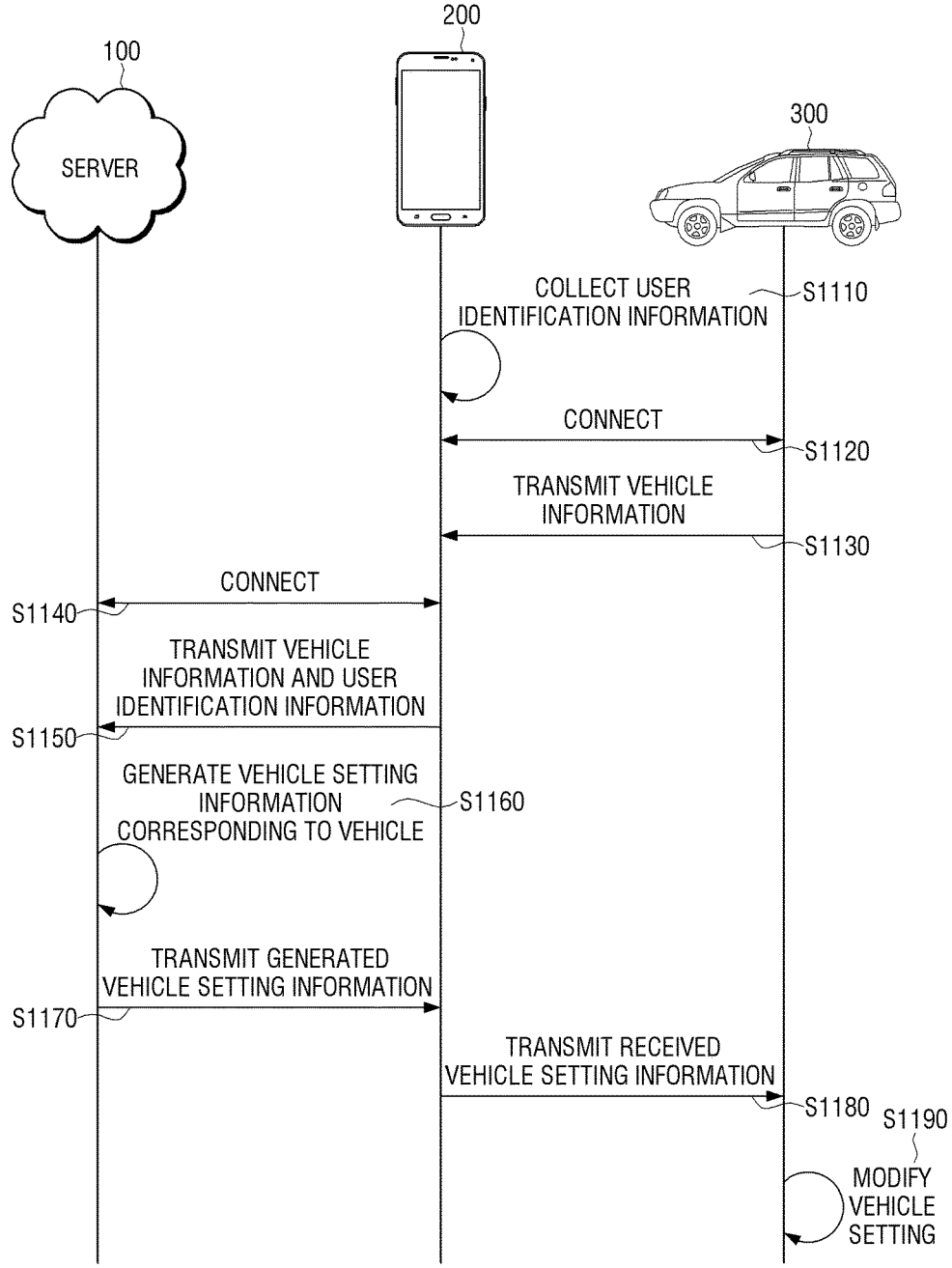
FIG. 11 is a flow diagram of a process in a server for generating vehicle setting information, according to an embodiment of the present disclosure.
Figure 12:
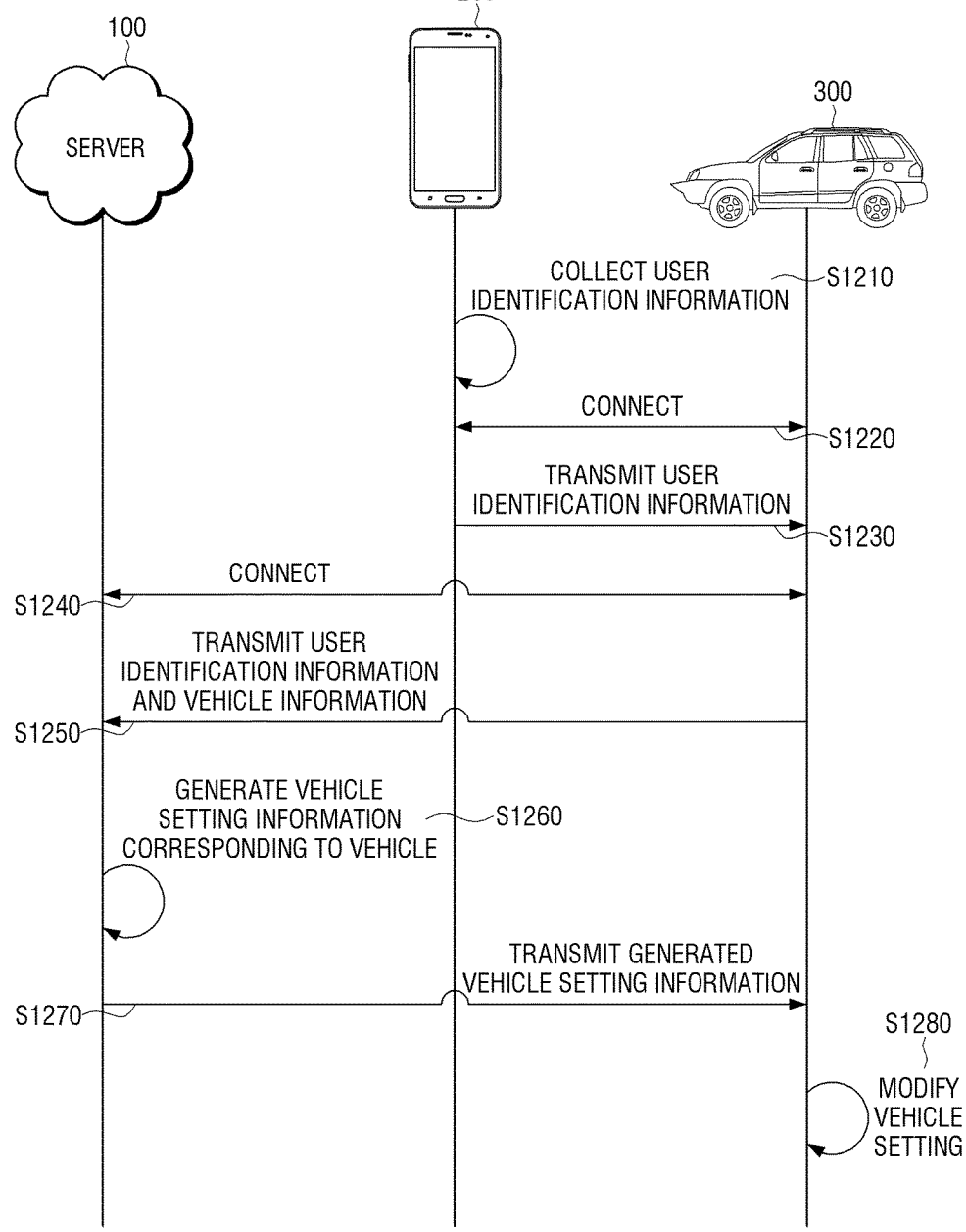
FIG. 12 is a flow diagram of a process in a server for generating vehicle setting information, according to another embodiment of the present disclosure.
Figure 13:
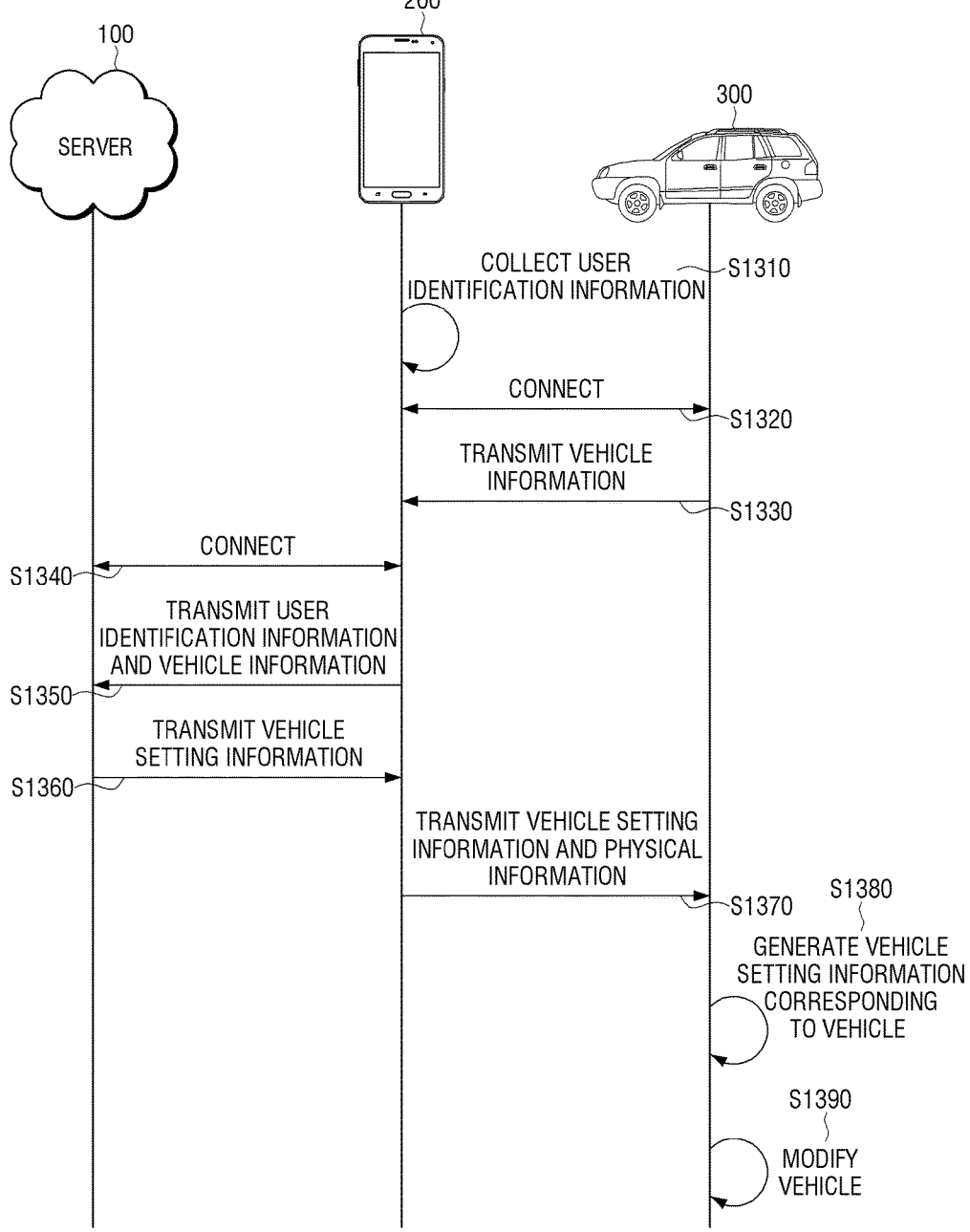
FIG. 13 is a flow diagram of a process in a vehicle for generating vehicle setting information, according to an embodiment of the present disclosure.
Figure 14:
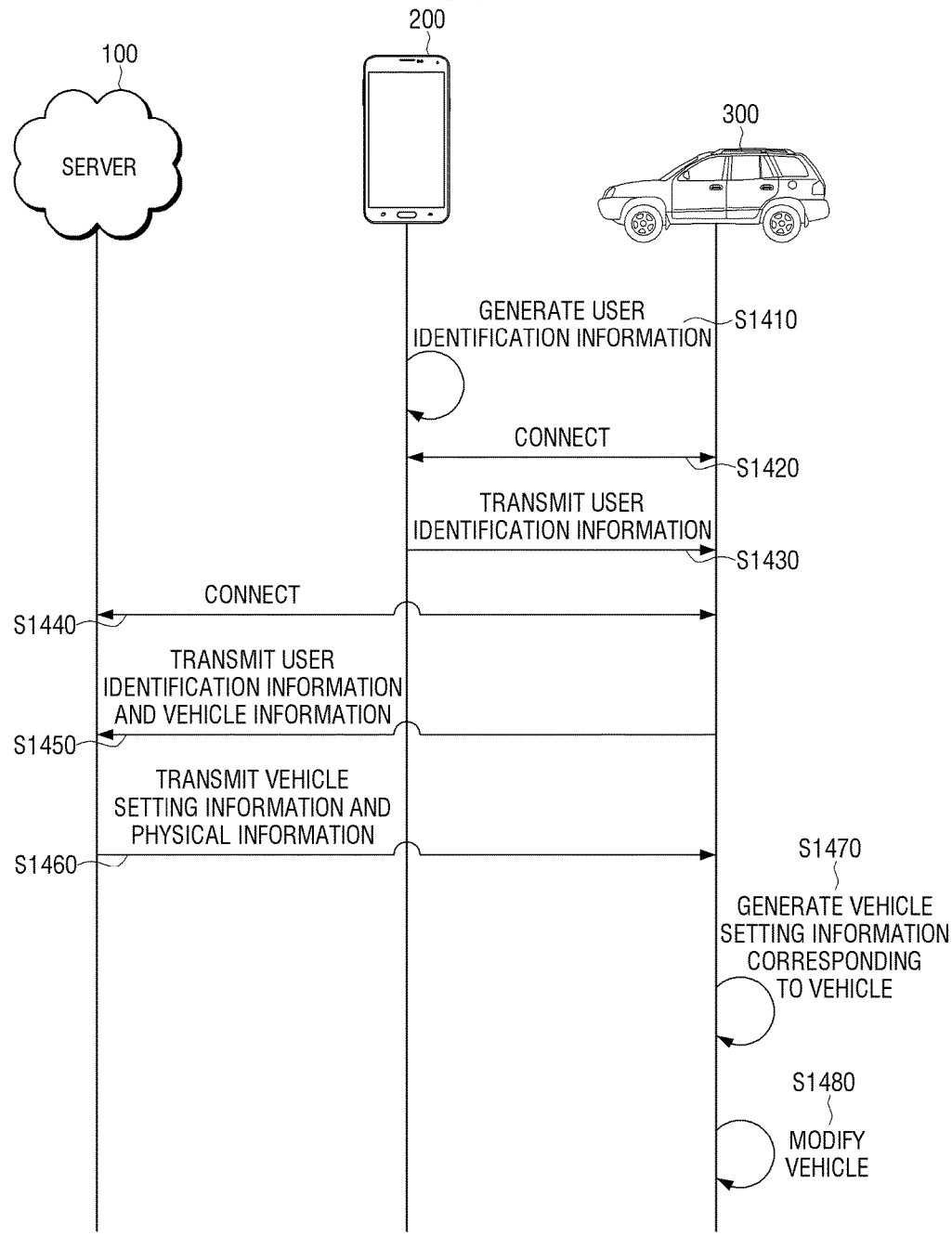
FIG. 14 is a flow diagram of a process in a vehicle for generating vehicle setting information, according to another embodiment of the present disclosure.

FIG. 11 is a flow diagram of a process in a server for generating vehicle setting information, according to an embodiment of the present disclosure;

FIG. 12 is a flow diagram of a process in a server for generating vehicle setting information, according to another embodiment of the present disclosure;

FIG. 13 is a flow diagram of a process in a vehicle for generating vehicle setting information, according to an embodiment of the present disclosure;

FIG. 14 is a flow diagram of a process in a vehicle for generating vehicle setting information, according to another embodiment of the present disclosure;

Referring to FIG. 11, the electronic device 200 collects the user identification information at step S1110. According to an embodiment of the present disclosure, the user identification information may be information for the user login ID with the vehicle application, the fingerprints of a user, or the iris of a user.

Further, the electronic device 200 connects the vehicle 300 through the collected user identification information at step S1120. For example, the electronic device 200 may be networked with the vehicle 300 when a user logs in through the vehicle application.

Further, when the electronic device 200 transmits a vehicle information request signal to the vehicle 300, the vehicle 300 transmits the vehicle information to the electronic device 200 at step S1130. According to an embodiment of the present disclosure, the vehicle information may include various pieces of information regarding the vehicle 300. For example, the vehicle information may include information of the type of vehicle 300, and the size and position of components within the vehicle.

Further, the electronic device 200 connects to the server 100 at step S1140. For example, the electronic device 200 may be connected to the server 100 when a user logs in through the vehicle application.

Further, when the electronic device transmits the vehicle information and the user identification information to the server 100 at step S1150, the server 100 may search the vehicle setting information and the physical information corresponding to the user identification information. According to an embodiment of the present disclosure, the vehicle setting information may include information for setting of the vehicle previously used by a user. The vehicle setting information may include the first setting information of adaptive value information of the vehicle components according to the type of vehicle, and the second setting information having a constant setting value irrespective of the type of vehicle.

Further, the server 100 generates the vehicle setting information corresponding to the vehicle 300 at step S1160 and transmits a result to the electronic device 200 at step S1170 based on the previously stored vehicle setting information and physical information, and the received vehicle information from the electronic device 200, and the electronic device 200 transmits the received vehicle setting information to the vehicle 300 at step S1180.

The vehicle 300 receiving the vehicle setting information may change the setting of the vehicle based on the vehicle setting information at step S1190.

FIG. 12 is a flow diagram of a process of generating the vehicle setting information when the server 100 generates the vehicle setting information and stores the user's physical information, and the vehicle 300 includes a modem for communication.

The electronic device 200 collects the user identification information at step S1210. Further, the electronic device 200 connects the vehicle 300 through the collected user identification information at step S1220 and then transmits the user identification information to the vehicle 300 at step S1230.

Further, the vehicle 300 connects to the server 100 through the modem in the vehicle 300 at step S1240, and transmits the previously stored vehicle information and the user identification information received from the electronic device 200 to the server 100 at step S1250. In the above example, the vehicle 300 may previously store a network address of the server 100.

Further, the server 100 searches the vehicle setting information and the physical information corresponding to the user identification information, generates the vehicle setting information corresponding to the vehicle 300 based on the vehicle information received from the vehicle 300 at step S1260, and transmits a result to the vehicle 300 at step S1270. The vehicle 300 receiving the vehicle setting information may change the setting of the vehicle based on the vehicle setting information at S1280. In the above example, the server 100 may previously store a network address of the vehicle.

FIG. 13 is a flow diagram of a process of generating the vehicle setting information when the vehicle 300 generates the vehicle setting information and the electronic device 200 stores the user's physical information.

Referring to FIG. 13, the electronic device 200 collects the user identification information at step S1310. The electronic device 200 connects the vehicle 300 through the collected user identification information at step S1320, and receives the vehicle information from the vehicle at step S1330.

The electronic device 200 connects the server at step S1340, and transmits the received vehicle information from the vehicle 300 to the server 100 at step S1350.

Further, the server 100 searches the vehicle setting information corresponding to the user identification information and transmits a result to the electronic device 200 at step S1360. The electronic device 200 transmits the previously stored physical information and the vehicle setting information received from the server 100 to the vehicle 300 at step S1370.

The vehicle 300 generates the vehicle setting information corresponding to the vehicle 300 based on the received vehicle setting information, physical information and vehicle information at step S1380.

FIG. 14 is a flow diagram of a process of generating the vehicle setting information when the vehicle 300 generates the vehicle setting information, the server 100 stores the user's physical information, and the vehicle 300 includes an internal modem for communication.

Referring to FIG. 14, the electronic device 200 collects the user identification information at step S1310. The electronic device 200 connects the vehicle 300 through the collected user identification information at step S1320 and then transmits the user identification information to the vehicle 300 at step S1330.

The vehicle 300 connects to the server 100 through the internal modem in the vehicle 300 at step S1340, and transmits the vehicle information and the received user identification information from the electronic device 200 to the server 100 at step S1350.

Further, the server 100 searches the vehicle setting information and the physical information corresponding to the user identification information, and transmits the vehicle setting information and the physical information to the vehicle 300 at step S1360.

The vehicle 300 generates the vehicle setting information corresponding to the vehicle 300 based on the previously stored vehicle information, the received vehicle setting information and the physical information from the server 100 at step S1370, and changes the setting of the vehicle based on the above at step S1380.

Figure 15:
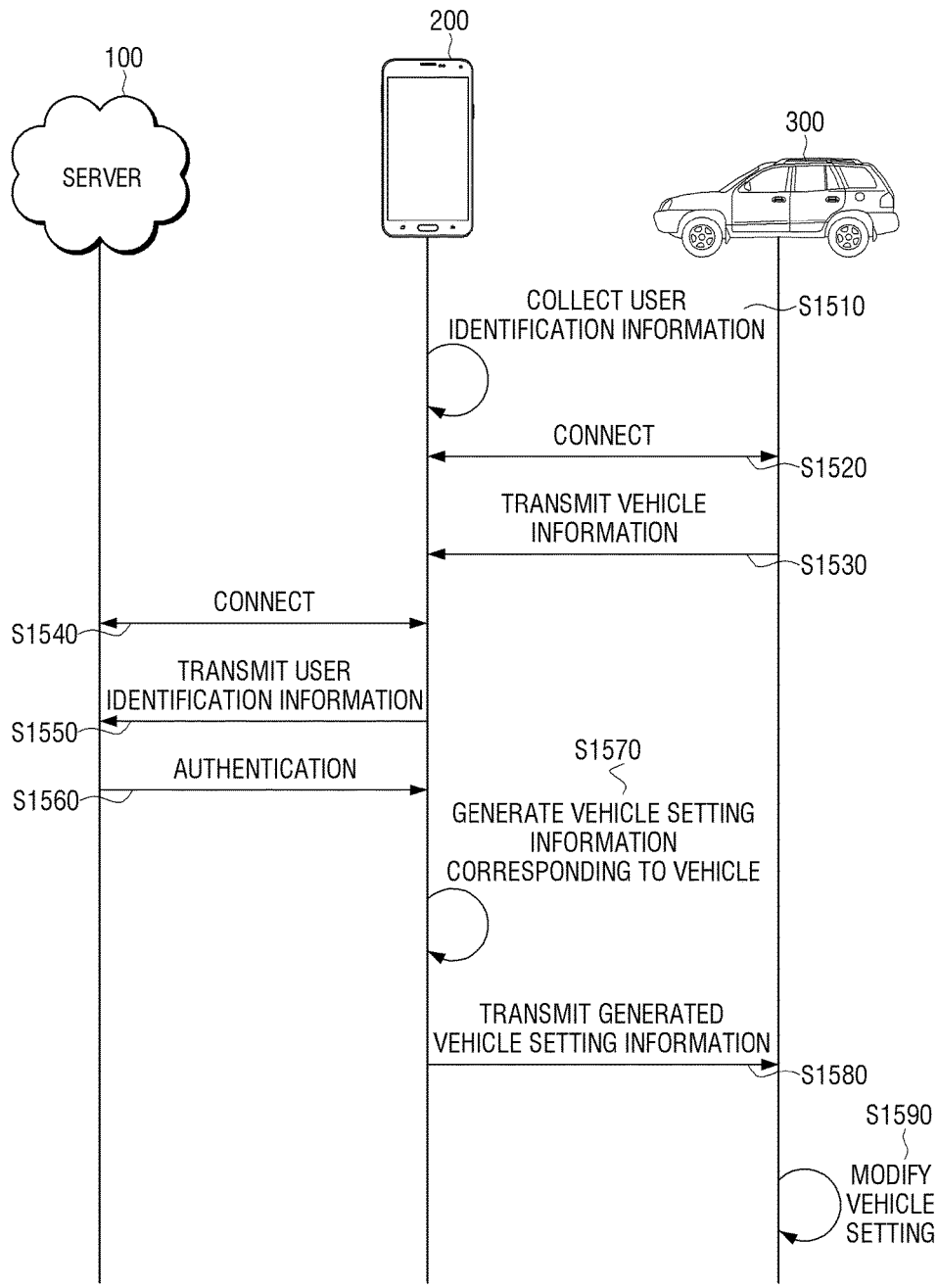
FIG. 15 is a flow diagram of a process in an electronic device for generating vehicle setting information, according to an embodiment of the present disclosure.

FIG. 15 is a flow diagram of a process of generating the vehicle setting information when the electronic device 200 generates the vehicle setting information and stores the user's physical information.

Referring to FIG. 15, the electronic device 200 collects the user identification information at step S1510. Further, the electronic device 200 connects to the vehicle 300 through the collected user identification information at step S1520. Further, when the electronic device 200 transmits a vehicle information request signal to the vehicle 300, the vehicle 300 transmits the vehicle information to the electronic device 200 at step S1530.

Further, when the electronic device 200 connects to the server 100 at step S1540, and transmits the user identification information to the server 100 at step S1550, the server 100 determines whether a user corresponding to the user identification information is an authorized user. For example, when a user logs in through the vehicle application, the server 100 may determine whether a corresponding ID passed the authorization process. Further, when the user authorization completes at step S1560, the server 100 generates the vehicle setting information corresponding to the vehicle 300 based on the previously stored physical information and vehicle setting information, and also the vehicle information received from the vehicle 300 at 51570, and transmits a result to the vehicle 300 at step S1480.

The vehicle 300 receiving the vehicle setting information may change the setting of the vehicle based on the vehicle setting information at step S1590.

According to an embodiment of the present disclosure, a user may perform setting of a personalized vehicle using various methods.

Figure 16:
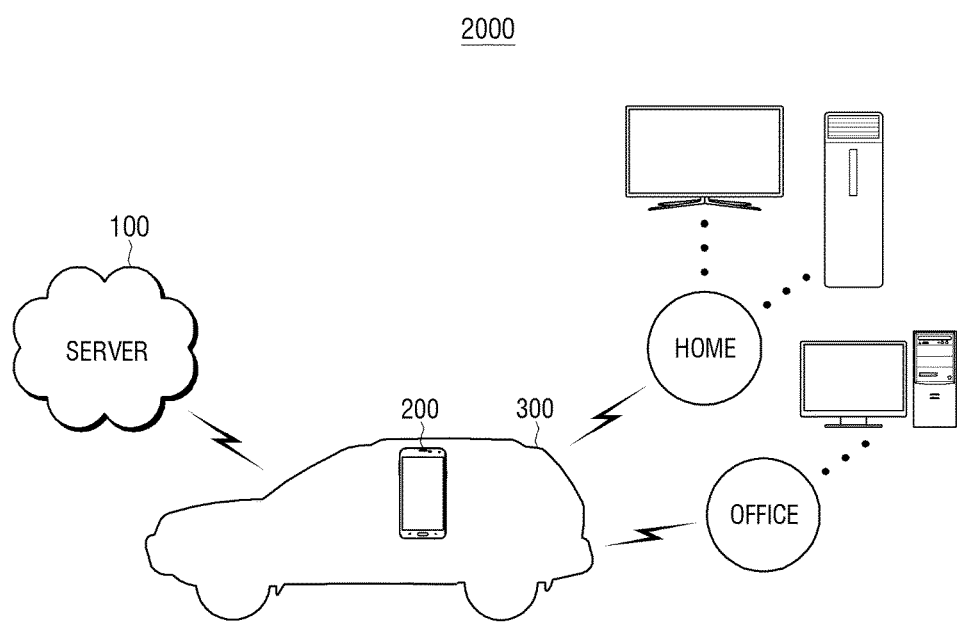
FIG. 16 illustrates an electronic device in a network with Internet of things (IoT) devices, according to an embodiment of the present disclosure.

FIG. 16 illustrates an electronic device in a network with IoT devices, according to an embodiment of the present disclosure.

Referring to FIG. 16, an electronic device system 2000 according to an embodiment of the present disclosure includes a server 100, an electronic device 200 and a vehicle 300.

According to an embodiment of the present disclosure, at least one of the electronic device 200 and the vehicle 300 may be connected to the IoT device through a network. In the above example, the vehicle 300 may include a modem for networked communications. The IoT device may be various types of electronic devices such as a TV, an air-conditioner, a lighting device, and a computer for use at home or office.

Further, the server 100 may receive a sensing signal from at least one of the electronic device 200 and the vehicle 300 when at least one of the electronic device 200 and the vehicle 300 approaches the IoT device.

When a sensing signal is transmitted from the IoT device to the server 100, the IoT device may perform a previously set operation. The previously set operation performed by the IoT device may be different according to a user of the electronic device 200 or the vehicle 300. For example, when a user of the electronic device 200 is A, the previously set operation may be an operation to turn on a TV at home. Further, when a user is B, the previously set operation may be an operation to turn on a computer at home.

In the above example, the server 100 may distinguish and store the IoT device operation according to each user, and receive the user identification information from at least one of the electronic device 200 and the vehicle 300 in order to distinguish the user. According to an embodiment of the present disclosure, the user identification information may be information on the fingerprints of the user, the iris, or the ID login through the vehicle application. Accordingly, the server 100 may distinguish a user based on the user identification information received from at least one of the electronic device 200 and the vehicle 300, and transmit a control signal to the IoT device set by the identified user.

Accordingly, the electronic device system according to an embodiment of the present disclosure may distinguish and operate the IoT device according to a user of the vehicle 300, and the user may set the personalized environment setting for home or office more conveniently.

The control method of the vehicle according to an embodiment of the present disclosure, may be executed as a program running on a computer and may be stored in a non-transitory recording medium that may be read by a computer. For example, the non-transitory computer readable recording medium may store a program including steps of transmitting the user identification information to the server, receiving the vehicle setting information and the physical information corresponding to the user identification information from the server, receiving the vehicle information from the vehicle, generating the vehicle setting information corresponding to the vehicle based on the received vehicle setting information, physical information and vehicle information, and transmitting the generated vehicle setting information to the vehicle. The non-transitory recording medium that may be read by a computer may be read only memory (ROM), random access memory (RAM), compact disk ROM (CD-ROM), magnetic tape, floppy disk, optical data storing device, and so on.

The non-transitory recording medium that may be read by a computer may be distributed on a networked computer system, and codes that may be read by a computer may be stored and implemented using a distribution method. Further, functional programs, codes and code segments for implementation of the above method may be inferred from programmers skilled in the art.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. An electronic device, comprising:
a first communicator;
a second communicator; and
a processor configured to:
control the first communicator to transmit user identification information to a server and receive vehicle setting information and physical information corresponding to the user identification information from the server, wherein the vehicle setting information is based on an arrangement of at least one component included in a first vehicle, the physical information and vehicle information corresponding to the first vehicle,
receive, through the second communicator, vehicle information corresponding to a second vehicle from the second vehicle,
generate information on an arrangement of at least one component included in the second vehicle based on the vehicle setting information, the physical information and the vehicle information corresponding to the second vehicle, and
control the second communicator to transmit the generated information to the second vehicle.

2. The electronic device of claim 1, wherein the processor is further configured to generate third setting information corresponding to the second vehicle based on first setting information and second setting information included in the vehicle setting information received from the server, the received physical information and the received vehicle information, and transmit the second setting information and the generated third setting information to the second vehicle.

3. The electronic device of claim 2, wherein the first setting information comprises information which is adaptively changed according to a type of a vehicle, and
wherein the second setting information comprises information having a constant setting value irrespective of the type of the vehicle.

4. The electronic device of claim 2, wherein the first setting information comprises a field of view information of the user in the first vehicle,
wherein the processor is further configured to determine an arrangement of a driver's seat in the second vehicle based on the field of view information, the physical information and the vehicle information received from the second vehicle, and transmit information regarding the determined arrangement of the driver's seat to the second vehicle, and
wherein the arrangement of the second vehicle comprises an arrangement in which the user has a same field of view in the second vehicle as the first vehicle.

5. The electronic device of claim 4, wherein the arrangement of the driver's seat comprises at least one of a distance between a pedal and the driver's seat in the second vehicle and an angle of a driver's seat in the second vehicle.

6. The electronic device of claim 2, wherein the second setting information comprises information regarding at least one application related to the vehicle, means of payment, network connection, navigation destination and driving mode.

7. The electronic device of claim 1, further comprising a display, wherein the processor is further configured to receive the vehicle information from the second vehicle, transmit the user identification information input through a user interface displayed on the display and transmit the received vehicle information to the server.

8. The electronic device of claim 1, wherein the processor is further configured to control the second communicator to transmit the vehicle information received from the second vehicle to the server.

9. The electronic device of claim 8, wherein the server determines whether the user is authorized to access the second vehicle when the user identification information and the vehicle information are received from the electronic device, and transmits the vehicle setting information and the physical information to the electronic device when the user is determined to have authorized access to the vehicle.

10. A vehicle control method, comprising:
transmitting user identification information to a server;
receiving vehicle setting information and physical information corresponding to the user identification information from the server, wherein the vehicle setting information is based on an arrangement of at least one component included in a first vehicle, the physical information and vehicle information corresponding to the first vehicle;
receiving vehicle information corresponding to a second vehicle from the second vehicle;
generating information on an arrangement of at least one component included in the second vehicle based on the vehicle setting information, the physical information and the vehicle information corresponding to the second vehicle; and
transmitting the generated information to the second vehicle.

11. The vehicle control method of claim 10, wherein the vehicle setting information received from the server comprises first setting information and second setting information,
wherein the vehicle setting information further comprises third setting information corresponding to the second vehicle based on the received physical information and the received vehicle information, and
wherein transmitting the generated vehicle setting to the second vehicle comprises transmitting the second setting information and the third setting information to the second vehicle.

12. The vehicle control method of claim 11, wherein the first setting information comprises information which is adaptively changed according to a type of a vehicle, and
wherein the second setting information comprises information having a constant setting value irrespective of the type of the vehicle.

13. The vehicle control method of claim 11, wherein the first setting information comprises a field of view information of the user in the first vehicle,
wherein the vehicle setting comprises an arrangement of a driver's seat in the second vehicle based on the field of view information, the physical information, and the vehicle information received from the second vehicle, and
wherein the arrangement of the driver's seat in the second vehicle comprises an arrangement in which the user has a same field of view in the second vehicle as the first vehicle.

14. The vehicle control method of claim 13, wherein the arrangement of the driver's seat comprises at least one of a distance between a pedal and a driver's seat in the second vehicle, and an angle of the driver's seat in the second vehicle.

15. The vehicle control method of claim 11, wherein the second setting information comprises information regarding at least one application related to the vehicle, means of payment, network connection, navigation destination and driving mode.

16. The vehicle control method of claim 10, further comprising:
displaying a user interface comprising the user identification information and the received vehicle information; and
transmitting the user identification information and the received vehicle information to the server in response to a user command input through the user interface.

17. The vehicle control method of claim 10, further comprising transmitting the vehicle information received from the second vehicle to the server.

18. The vehicle control method of claim 17, wherein the server determines whether the user has authorized access to the second vehicle,
wherein receiving the vehicle setting information and physical information corresponding to the user identification information from the server comprises receiving the vehicle setting information and the physical information when the user is determined as having authorized access to the server.

* * * * *